(12) United States Patent
Chen et al.

(10) Patent No.: US 12,099,973 B2
(45) Date of Patent: Sep. 24, 2024

(54) COMPUTER SYSTEM AND METHOD TO EFFICIENTLY EXTEND A WORKFLOW IN SOFTWARE

(71) Applicant: SAP SE, Walldorf (DE)

(72) Inventors: Wei Chen, Shanghai (CN); Shilei Hu, Shanghai (CN)

(73) Assignee: SAP SE, Walldorf (DE)

( * ) Notice: Subject to any disclaimer, the term of this patent is extended or adjusted under 35 U.S.C. 154(b) by 213 days.

(21) Appl. No.: 17/735,815

(22) Filed: May 3, 2022

(65) Prior Publication Data

US 2023/0359451 A1  Nov. 9, 2023

(51) Int. Cl.
| | |
|---|---|
| *G06Q 10/10* | (2023.01) |
| *G06F 8/20* | (2018.01) |
| *G06F 8/34* | (2018.01) |
| *G06F 8/35* | (2018.01) |
| *G06F 8/38* | (2018.01) |
| *G06F 8/40* | (2018.01) |
| *G06F 8/65* | (2018.01) |
| *G06F 3/0484* | (2022.01) |

(52) U.S. Cl.
CPC ............. *G06Q 10/103* (2013.01); *G06F 8/20* (2013.01); *G06F 8/34* (2013.01); *G06F 8/35* (2013.01); *G06F 8/38* (2013.01); *G06F 8/40* (2013.01); *G06F 8/65* (2013.01); *G06F 3/0484* (2013.01)

(58) Field of Classification Search
CPC ...... G06F 8/65; G06F 8/40; G06F 8/38; G06F 8/20; G06F 3/0484; G06Q 10/103
See application file for complete search history.

(56) References Cited

U.S. PATENT DOCUMENTS

| | | | | |
|---|---|---|---|---|
| 2002/0184610 | A1* | 12/2002 | Chong | G06F 8/20 717/109 |
| 2004/0046787 | A1* | 3/2004 | Henry | G06F 8/38 715/744 |

OTHER PUBLICATIONS

Cong et al., CN 111158663, (translation) Jul. 2, 2021, 43 pgs <CN_111158663.pdf>.*

* cited by examiner

*Primary Examiner* — Tuan A Vu
(74) *Attorney, Agent, or Firm* — Fountainhead Law Group, PC

(57) ABSTRACT

A computer-implemented system and method of extending a workflow. The system translates the workflow into a programming data structure, builds a model structure based on the programming data structure, collects extension instructions related to changing the workflow and orders the extension instructions according to dependencies among the extension instructions, and generates an extended workflow based on applying the extension instructions to the original workflow. In this manner, the system reduces the amount of manual effort in extending the workflow.

20 Claims, 15 Drawing Sheets

```
FlowBuilder.newBuilder().name("example")
    .start("task_a")                          350
        .on("condition_b")                    352
            .branchOn("yes")
                .next("task_d")
                .parallel(next("e").next("f"))
                .next("task_g")
                .endBranch()
            .branchOn("no")
                .next("task_c")
                .return("condition_b")
                .endBranch();
```

FIG. 3B

```
<process id="Process_1">
  <startEvent id="StartEvent" name="Notification Sent">
   <outgoing>task_a</outgoing>
  </startEvent>
  <task id="task_a" name="Task A">
   <outgoing>SequenceFlow_1</outgoing>
  </task>
  <sequenceFlow id="SequenceFlow_1" name="" sourceRef="task_a" targetRef="condition_b"/>
  <exclusiveGateway id="condition_b" name="Condition B?">
   <incoming>SequenceFlow_1</incoming>
   <outgoing>SequenceFlow_2</outgoing>
   <outgoing>SequenceFlow_3</outgoing>
  </exclusiveGateway>
  <sequenceFlow id="SequenceFlow_2" name="" sourceRef="condition_b" targetRef="task_c"/>
  <sequenceFlow id="SequenceFlow_3" name="" sourceRef="condition_b" targetRef="task_d"/>
  <task id="task_c" name="Task C">
   <outgoing>condition_b</outgoing>
  </task>
  <task id="task_d" name="Task D">
   <outgoing>SequenceFlow_4</outgoing>
  </task>
  <sequenceFlow id="SequenceFlow_4" name="" sourceRef="task_d" targetRef="parallelFlow1"/>
  <ParallelFlow id="parallelFlow1" name="" sourceRef="SequenceFlow_4" targetRef="task_g">
    <sequenceFlow id="SequenceFlow_5" name="" sourceRef="parallelFlow1" targetRef="task_f"/>
    <sequenceFlow id="SequenceFlow_6" name="" sourceRef="parallelFlow1" targetRef="task_d"/>
  </ParallelFlow>
  <task id="task_e" name="Task E">
  </task>
  <task id="task_f" name="Task F">
  </task>
  <task id="task_g" name="Task G">
   <outgoing>EndEvent</outgoing>
  </task>
  <endEvent id="EndEvent" name="Notification Sent">
  </endEvent>
</process>
```

The procedure to generate the simplified DOM:
1. Create an empty DOM Tree. Let Parent Element $E_{parent}$ = null.
2. Traverse the programing data structure, starting from the "start event". So add "start event" to $N_{current}[]$.
3. Get nodes which are candidates for transferring to DOM elements.
   While $N_{current}[]$ is not empty
      a. Remove first $N_i$ from $N_{current}[]$, Get the node type ($T$) of the programing data structure node $N_i$.
      b. If $T$ is an activity or a conditional node, add $N_i$ to $N_{candidate}[]$;
      c. If $T$ is not an activity nor conditional node, then get the children nodes of the node, and add them to $N_{current}[]$;
4. Transfer Candidate Nodes in $N_{cadidate}[]$ to DOM elements.
   a. for each item in the $N_{cadidate}[]$, create a simple element $E_i$ and add it to $E[]$. For each simple element, specify the reference to $N_{candidate}[i]$ as part of the custom data of the element.
   b. If length of $E[]$ is 1, then let $E$ be the only element in $E[]$.
   c. If length of $E[]$ is larger than 1, then create an array element $E$. And add each element in $E[]$ as child of $E$.
5. Add the new created DOM elements to the tree
   a. If $E_{parent}$ is null, let the new created element $E$ be the root of the new DOM tree.
   b. If $E_{parent}$ is not Null, append the new created element $E$ to $E_{parent}$ as its child.
   c. Add $N_{new}$ to PNs[].
6. For each Node $N_i$ in $N_{cadidate}[]$
   a. Let $E_{parent}$ = $E_i$
   b. For each node $CN_i$ in the children of the node $N_i$.
   c. Let $N_{current}[]$ = $[CN_i]$
   d. Repeat from Step 4.

Pseudocode Listing 600

FIG. 6

//task_e ⟵ 702

//task_d/branch[0]/task_e ⟵

/task_a/condition_b/branch[1]/task_d/branch[0]/task_e ⟵ 704

//condition_b/branch[1]//task_e ⟵
706

Pseudocode Listing 700

FIG. 7

```
@FlowContribution(flow="flowA", action=insert, path="//task_e")
@Bean
Task taskBeforeTaskE() {
  return new Activity() {
    ...
  }
}
@FlowContribution(flow="flowA", action=insert, path="//task_e")
@Bean
Task taskBeforeTaskE2() {
  return new Activity() {
    ...
  }
}

@FlowContribution(flow="flowA", action=append, path="//task_e")
@Bean
Task taskAfterTaskE() {
  return new Activity() {
    ...
  }
}

@FlowContribution(flow="flowA", action=append)
@Bean
Task taskAppendToTail() {
  return new Activity() {
    ...
  }
}

@FlowContribution(flow="flowA", action=append, path="//taskX")
@Bean
Task taskAfterTaskX1() {
  return new Activity() {
    ...
  }
}
```

802 (points to the second @FlowContribution block)

Pseudocode Listing 800

FIG. 8

1) Read all the defined flow contributions. There could be several flow contributors which are responsible to load the flow contributions in different flows. Such as a.

*a)*    *AnnotationFlowContributor* can read contributions from Annotated beans in java application.

*b)*    *DSLFlowContributor* can read contributions from DSL file,

*c)*    *ServiceFlowContributor* can get contributions from services.

902

2) Then group the collected contributions by flow and position in the flow. See TABLE 1

3) Order the position group in the same flow group. As the contributions themself could have dependences among them, so the contributions in the same flow group should be ordered first. The process can be depicted as below:

a)    Those position groups with their paths are not defined are picked first b)    Then those position groups with their paths are already known in the current structure of the flow will be picked.

c)    Finally pick the remaining groups.

Pseudocode Listing 900

FIG. 9

1. Define a list (Lu) which is going to hold The Un-pinned Position Group
2. For each position group for the flow, do the following:
    a. Check if the path is defined in the position group, if NO, then go to step c.
    b. Check if the path given by the position group can be found in current flow structure.
        i. If NO, add the position group to Lu and stop to process the next position group.
        ii. otherwise continue to step c.
    c. Add the contribution to the right position according to the path and the action. See section "4.1"
3. If the List Lu is empty, which means there is no flow contribution in the ToBeDecided Position Group:
    a. If yes, then stop the entire process,
    b. otherwise, continue to next step.
4. Let $S_o$ be the original size of the List $L_u$.
5. Rebuild the DOM to reflect the change of the extended flow at the current stage.
6. For each position group in $L_u$, do the following:
    a. Check if the path given by the position group can be found in current flow structure. If NO, process the next position group; otherwise continue to step b.
    b. Add the contribution to the right position according to the path and the action.
    c. Remove the position group from $L_u$.
    d. Rebuild the DOM to reflect the change of the extended flow.
7. Let the $S_n$ be the size of the List Lu at the current stage, and
    a. If $S_n == 0$, then stop the process.
    b. If $S_n > S_o$, then back to step #6.
    c. if $S_o == S_u$, then stop the process and raise error to say the contributions in Lu cannot be added to the flow because the path given cannot be located.

Pseudocode Listing 1000

FIG. 10

1. Get the action of the contribution: $A_{ct}$.
2. Get the path of the position group: $P_{ath}$.
3. Get the referenced node Rn based on the path $P_{ath}$ and action $A_{ct}$:
   a. If the path is given, then find the node Rn by the path (JSONPath, XPATH, etc.)
   b. If the path is not given, then check the action:
      i. If the action is insert, set the reference node Rn to be the first major node.
      ii. If the action is "append", then set the reference node Rn to be the last major node.
      iii. If the action is "replace", then raise an error, the path must be given when the action is "replace".
4. Apply the action to the referenced node Rn
   a. If the action is insert, then add the contribution before the reference node Rn.
   b. If the action is "append", then add the contribution after the reference node Rn.
   c. If the action is "replace", then replace the reference node Rn with the contribution.

Pseudocode Listing 1100

FIG. 11

COMPUTER SYSTEM AND METHOD TO EFFICIENTLY EXTEND A WORKFLOW IN SOFTWARE

CROSS REFERENCE TO RELATED APPLICATIONS

Not applicable.

BACKGROUND

The present disclosure relates to workflow management, and in particular, to reducing the time and effort involved in updating workflows.

A workflow is set of computer instructions that organizes a set of other software modules to achieve one or more tasks. In a microservices architecture, the workflow is the centralized controller that calls upon numerous microservices to complete the tasks. In large cloud deployed computer systems, there can be hundreds if not thousands of microservices that are invoked to complete tasks. It is the workflow that coordinates when any given microservice is invoked.

As such, a workflow is the backbone that automates when other procedures and processes, such as microservices, are invoked in such a manner as to efficiently get work done in an organization. A workflow rule is the main container for a set of workflow instructions. These instructions may be summed up in an if/then statement. An example of a workflow instruction is, "If it's raining, then bring an umbrella." Workflow rules can be broken into two main components: criteria and actions. The criteria are the "if" part of the "if/then" statement. In other words, what must be true of the record for the workflow rule to execute the associated actions. The actions are the "then" part of the "if/then" statement. In other words, what to do when the record meets the criteria. In the raining example, the criteria are "it's raining" and the action is "bring an umbrella". If the criteria aren't met (e.g., it isn't raining), then the action isn't executed (e.g., you don't bring an umbrella). When a record meets all the criteria for a workflow rule, that rule's actions are executed.

Once a workflow is deployed and in use, being able to quickly and efficiently provide information on where modifications to that existing workflow should be made is very difficult. There are also a plurality of different types of modifications that may be necessary to the workflow. For example, a process or microservice may be added or deleted from the workflow. Such a change may a result in upstream workflow changes, processes or microservices that precede the modified process or microservice in execution order, or downstream workflow changes, processes or microservices the succeed the modified process or microservice in execution order. Other workflow changes include adding or removing branches from the workflow. In these changes, the number of processes or microservices are not changed, but the branching and execution order of the processes and microservices changes. In yet other changes, a process or microservice may be replaced with an upgraded process or microservice. In these changes, the flow between processes and microservices is not changed, but the older process or microservice must be removed from the workflow while the updated process or microservice is added in its place.

As stated earlier, these workflows can be very large and very complex. In such system, being able to identify particular processes or microservices in a sea of hundreds or thousands of processes or microservices in a large workflow is extremely difficult.

Unless otherwise indicated herein, the approaches described in this section are not prior art to the claims in this application and are not admitted to be prior art by inclusion in this section.

SUMMARY

Given the above, a number of issues are presented. In the enterprise software area, there is not always a one-size-fits-all solution to activities such as provisioning a new system. A number of different workflows are necessary to adopt the variant requirements for different use cases from different customers or teams. A business solutions provider has a need to deliver one cloud application that must serve all tenants. In the organization of the solution provider, teams create different workflows based on the company standard flows to manage resources, to provision infrastructures, and to perform other activities.

Workflows play a great part in the success of business solutions. However, because the workflows are open for change, it is very difficult to manage them once they are delivered. Consider the difficulties involved in the following two cases. First, generically speaking, a generic application solution that ships some built-in workflows is initially provided in a default version, then customers adapt them. As the business needs evolve, those workflows need to be updated. Second, in a microservice architecture, a workflow is defined and maintained in order to control the numerous microservices correctly. If a microservice that contributes some steps to a workflow is upgraded, the definition and structure of the workflow often must be updated accordingly.

In one embodiment, a method extends workflows. The method includes loading, by a computer system, a workflow into a memory of the computer system. The workflow includes workflow rules, and a given workflow rule includes one or more criteria and one or more actions. Loading the workflow includes translating, by the computer system, the workflow into a programming data structure. The programming data structure includes nodes, where the nodes of the programming data structure correspond to the workflow rules.

The method further includes building, by the computer system, a model structure based on the programming data structure. The model structure includes nodes, where the nodes of the model structure correspond to the nodes of the programming data structure.

The method further includes receiving and collecting, by the computer system, extension instructions (e.g., modifications to the workflow that have been input by the developer), where the extension instructions correspond to changes to the workflow. Collecting the extension instructions includes ordering, by the computer system, the extension instructions according to dependencies among the extension instructions after they have been input by the developer.

The method further includes applying, by the computer system, the extension instructions to the workflow. Applying the extension instructions includes generating, by the computer system, an extended workflow.

A computer readable medium may store a computer program for controlling a computer to implement one or more steps of the above methods.

A system may implement one or more steps of the above methods, using one or more computer systems (e.g., a server computer, a database system, a client computer, etc.) to perform one or more of the method steps.

The subject matter described in this specification can be implemented to realize one or more advantages, including improving the efficiency of workflow developers when extending workflows.

The following detailed description and accompanying drawings provide a better understanding of the nature and advantages of the present invention.

BRIEF DESCRIPTION OF THE DRAWINGS

FIG. 3B shows an example of the workflow 300 (see FIG. 3A) defined via a DSL.

FIG. 3C shows an example of the workflow 300 (see FIG. 3A) defined via a markup language (e.g., XML).

FIG. 6 is a pseudocode listing 600 of a process to generate the model structure from the programming data structure.

FIG. 7 is a pseudocode listing 700 shows an example of an XPath for specifying an activity, such as in node 512 of FIG. 5.

FIG. 8 is a pseudocode listing 800 of an extension instruction.

FIG. 9 is a pseudocode listing 900 that describes a process for collecting the extension instructions.

FIG. 10 is a pseudocode listing 1000 that describes a process for applying the extension instructions to the target workflow.

FIG. 11 is a pseudocode listing 1100 that describes a process for applying the flow contributions of the extension instructions to the workflow.

DETAILED DESCRIPTION

Figure 1:
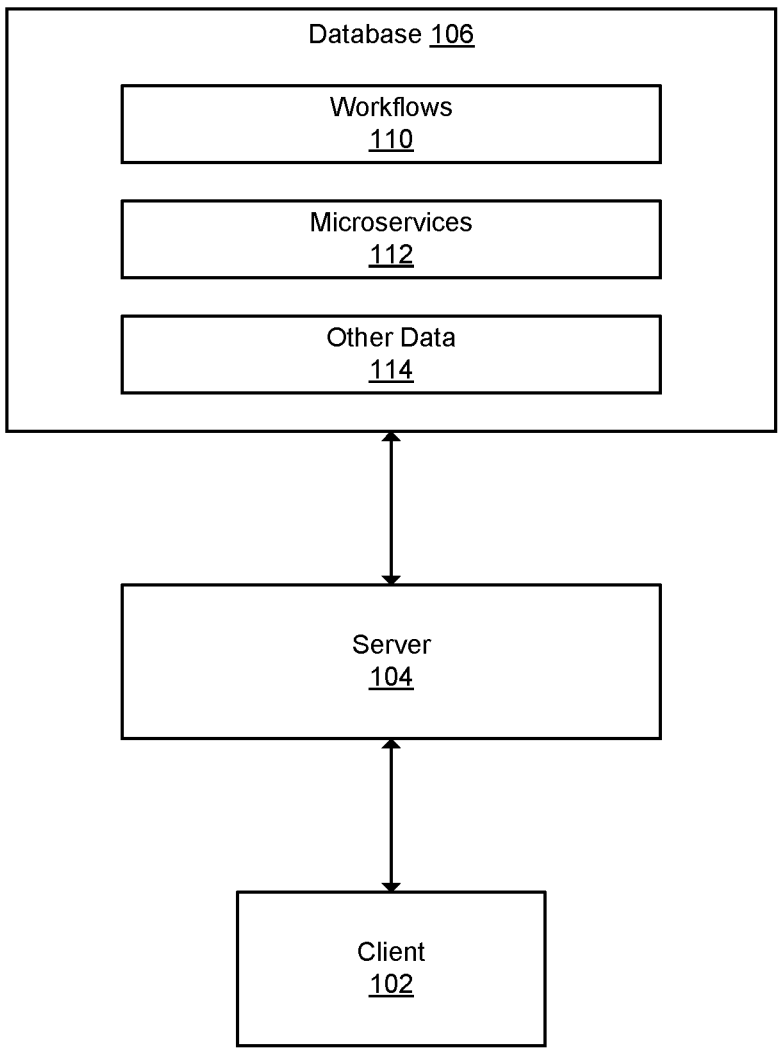
FIG. 1 is a block diagram of a workflow development system 100.

Described herein are techniques for workflow management. In the following description, for purposes of explanation, numerous examples and specific details are set forth in order to provide a thorough understanding of the systems and methods described herein. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

In this document, the term "server" is used. In general, a server is a hardware device, and the descriptor "hardware" may be omitted in the discussion of a hardware server. A server may implement or execute a computer program that controls the functionality of the server. Such a computer program may also be referred to functionally as a server, or be described as implementing a server function; however, it is to be understood that the computer program implementing server functionality or controlling the hardware server is more precisely referred to as a "software server", a "server component", or a "server computer program".

In this document, the term "database" is used. In general, a database is a data structure to organize, store, and retrieve large amounts of data easily. A database may also be referred to as a data store. The term database is generally used to refer to a relational database, in which data is stored in the form of tables and the relationship among the data is also stored in the form of tables. A database management system (DBMS) generally refers to a hardware computer system (e.g., persistent memory such as a disk drive or flash drive, volatile memory such as random access memory, a processor, etc.) that implements a database.

In this document, the terms "to store", "stored" and "storing" are used. In general, these terms may be used to refer to an active verb (e.g., the process of storing, or changing from an un-stored state to a stored state), to a state of being (e.g., the state of being stored), or both. For example, "storing a data record" may be used to describe the process of storing (e.g., the data record transitioning from the un-stored state to the stored state). As another example, "storing a data record" may be used to describe the current state of a data record (e.g., the data record currently exists in the stored state as a result of being previously stored). When only a single interpretation is meant, such meaning will be apparent from the context.

Overview

As further detailed below, embodiments are directed toward breaking down the workflow to an organization of activities. The workflow may be defined via formats such as JavaScript Object Notation (JSON), a domain-specific language (DSL), Extensible Markup Language (XML), or native programming code.

After the system has loaded the workflow in the memory, the system generates a data structure to represent the workflow process. The system translates the data file defining the data structure to a simplified Document Object Model (DOM) structure such as a DOM tree, of which nodes can be located with JSONPath (a query language for JSON with features similar to XPath for XML), XPath (XML Path Language), etc. Every node in the DOM structure is linked to the original structure of the workflow. The system may also instrument the flow enhancer to extend (e.g., to add to, to delete from, to edit, to modify, etc.) the flow via manipulating the DOM tree such as by adding an activity before a given activity, deleting an activity, replacing a given activity with the improved one, etc.

The system generally performs an extension process (e.g., adding, deleting, editing, modifying, etc.) using the following four steps. First, the system loads the workflow into memory. In this step, the system translates the data file defining the workflow to a programing data structure. Second, the system builds a simplified DOM tree based on the programming data structure. In this step, the system traverses the data file defining the programing data structure and picks necessary nodes in the programing data structure to create the simplified DOM. In the simplified DOM, each element therein corresponds to a node in the programing data structure (e.g., where the correspondence is defined using a link). Third, the system collects all the extension instructions (e.g., the additions, deletions, modifications, edits, etc.). In this step, the system defines ternary instructions composed of (path, action, object). When the system starts to extend (e.g., add to, delete from, modify, edit, etc.) the workflow, it collects the extensions either from files (e.g., from the workflow definition such as in FIG. 3B, FIG. 3C, etc.) or from models in the native programming language (e.g., as visualized according to the structure shown in FIG. 4), then orders them according to the dependencies among them. Fourth, the system applies the extension instructions. In this step, the system applies the extension instructions to the original workflow to generate the extended workflow.

FIG. 1 is a block diagram of a workflow development system 100. The workflow development system 100 may be implemented by one or more computer systems, for example as controlled by one or more computer programs, as further detailed below. The workflow development system 100 may include other components that (for brevity) are not discussed in detail. In general, the workflow development system 100 is used to create, delete, and modify workflows—a process generally referred to as "workflow extension". The workflow development system 100 includes a client computer 102, a server computer 104, and a database computer 106.

The client computer 102 generally provides a user interface for the user to interact with the workflow development system 100. The user is generally a developer who uses the workflow development system 100 to create, delete and modify workflows; this user may also be referred to as the workflow developer. For example, a baseline workflow may contain baseline configuration settings for configuring a computer system. Customer A may desire settings other than the baseline for their computer system, in which case the developer may modify the baseline workflow to generate Workflow A that includes Customer A's configuration settings. Similarly, Customer B may desire their own custom settings, in which case the developer may modify the baseline workflow or Workflow A to generate Workflow B, etc. This type of activity generally falls in the category of workflow extension.

A workflow often interacts with microservices to perform the actions of the workflow. In general, a microservice is a single-function module that has well-defined interfaces and operations. In computing, the microservice architecture is an architectural style that structures an application as a collection of microservices. A microservice is generally a service that has one or more of the following attributes: being highly maintainable and testable, loosely coupled, independently deployable, organized around business capabilities, and owned by a small team. The microservice architecture enables the rapid, frequent and reliable delivery of large, complex applications. It also enables an organization to evolve its technology stack. A microservice architecture may be contrasted with a monolithic architecture, in that the microservice architecture builds an application as a suite of small services, each running in its own process and being independently deployable. Because a microservice may be used for purposes other than just workflow actions, when the developer modifies a workflow, the interactions between the modified workflow and the microservices often require adjustment as well. This type of activity also generally falls in the category of workflow extension.

The server computer 104 generally executes computer programs that implement the workflow development system 100. The server 104 connects to the client computer 102 for the user to interact with the workflow development system 100, and connects to the database computer 106 to access the stored workflows, microservices, and other data.

The database computer 106 generally stores workflows 110, microservices 112, and other data 114. As discussed above, each of the workflows 110 defines a process for performing an activity, such as configuring a computer system. Each of the microservices 112 defines a single function, such as how to configure a software module when configuring Customer A's computer system. A given workflow then sequences a selected subset of the microservices 112 to fully provision Customer A's computer system. The other data 114 includes other data used by the database computer 106, the server computer 104, other computers (not shown), etc.

Numerous variations of the system shown in FIG. 1 may be used. For example, the client computer 102 may be one of a number of client computers that connect to the server computer 104. The server computer 104 may be one of a number of server computers that are configured as a cloud computer system. The database computer 106 may be one of a number of database computers that are configured as a cloud computer system. The server computer 104 and the client computer 106 may be implemented by the same computing device. More generally, the workflow development system 100 as a whole performs the functions described herein, so even though a particular function may be described in the context of a specific device (e.g., the server computer 104), such description is not limited to that specific device, but may be performed by the workflow development system 100 as a whole.

Figure 2:
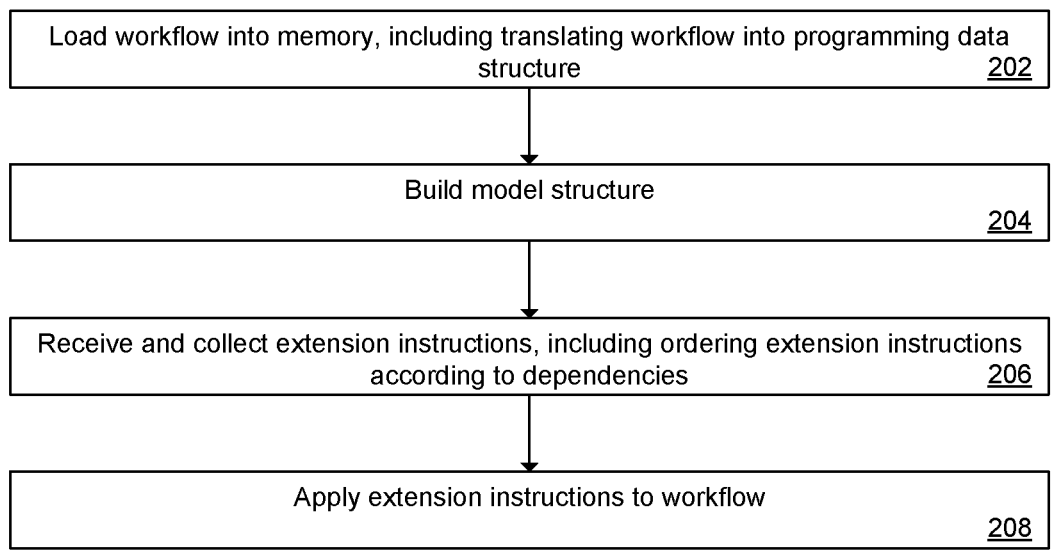
FIG. 2 is a flow diagram of a method 200 of extending a workflow.

FIG. 2 is a flow diagram of a method 200 of extending (e.g., adding, deleting, editing, modifying, etc.) a workflow. The method 200 may be implemented by a computer system, for example as controlled by executing one or more computer programs, such as the workflow development system 100 (see FIG. 1). The method 200 may include other steps that (for brevity) are not discussed in detail.

Figure 3A:
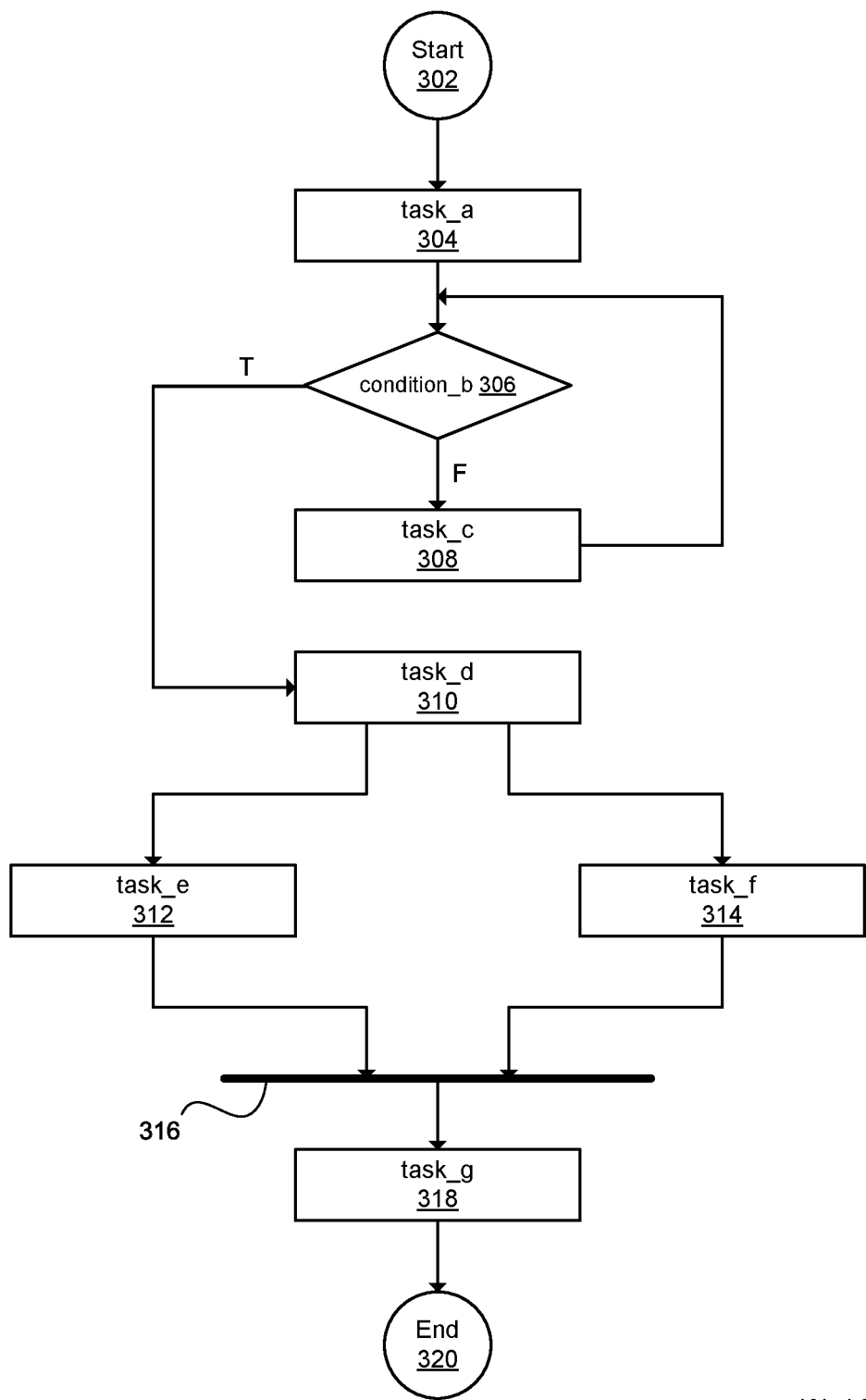
FIG. 3A is a flow diagram of an example workflow 300.

At 202, a computer system loads a workflow into memory. For example, the server computer 104 (see FIG. 1) may load one of the workflows 110 stored by the database computer 106 into its memory. The workflow includes a number of workflow rules, and a given workflow rule of the workflow rules includes one or more criteria and one or more actions, as discussed above. An example of a workflow is shown in FIG. 3A, which may be defined textually as shown in FIG. 3B, FIG. 3C, etc.

Figure 4:
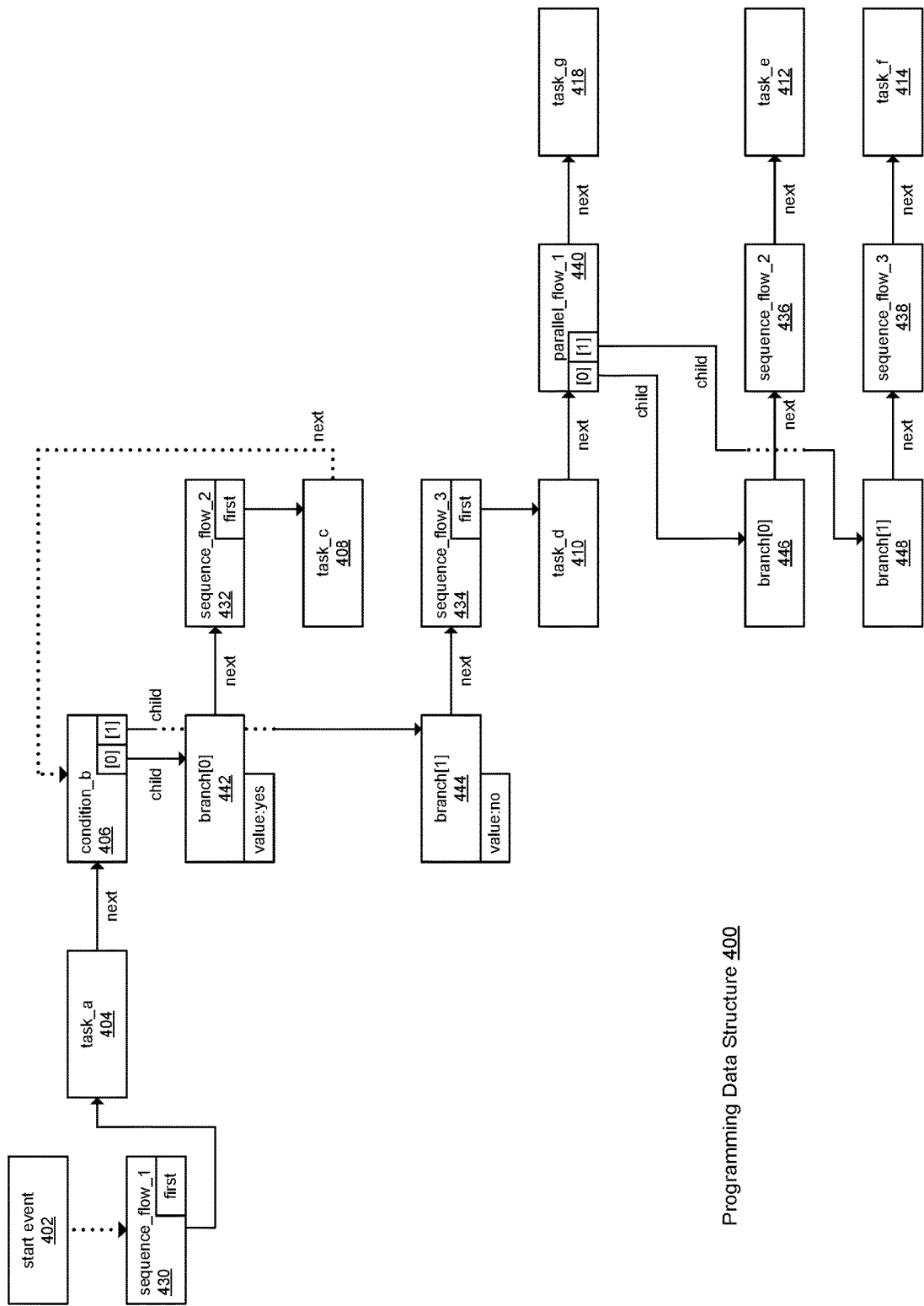
FIG. 4 is a diagram of an example programming data structure 400.

Loading the workflow includes the computer system translating the workflow into a programming data structure. The programming data structure includes a number of nodes, and the nodes of the programming data structure correspond to the workflow rules. An example of the programming data structure is shown in FIG. 4, and the loading process is described in more detail in Section 1 below.

Figure 5:
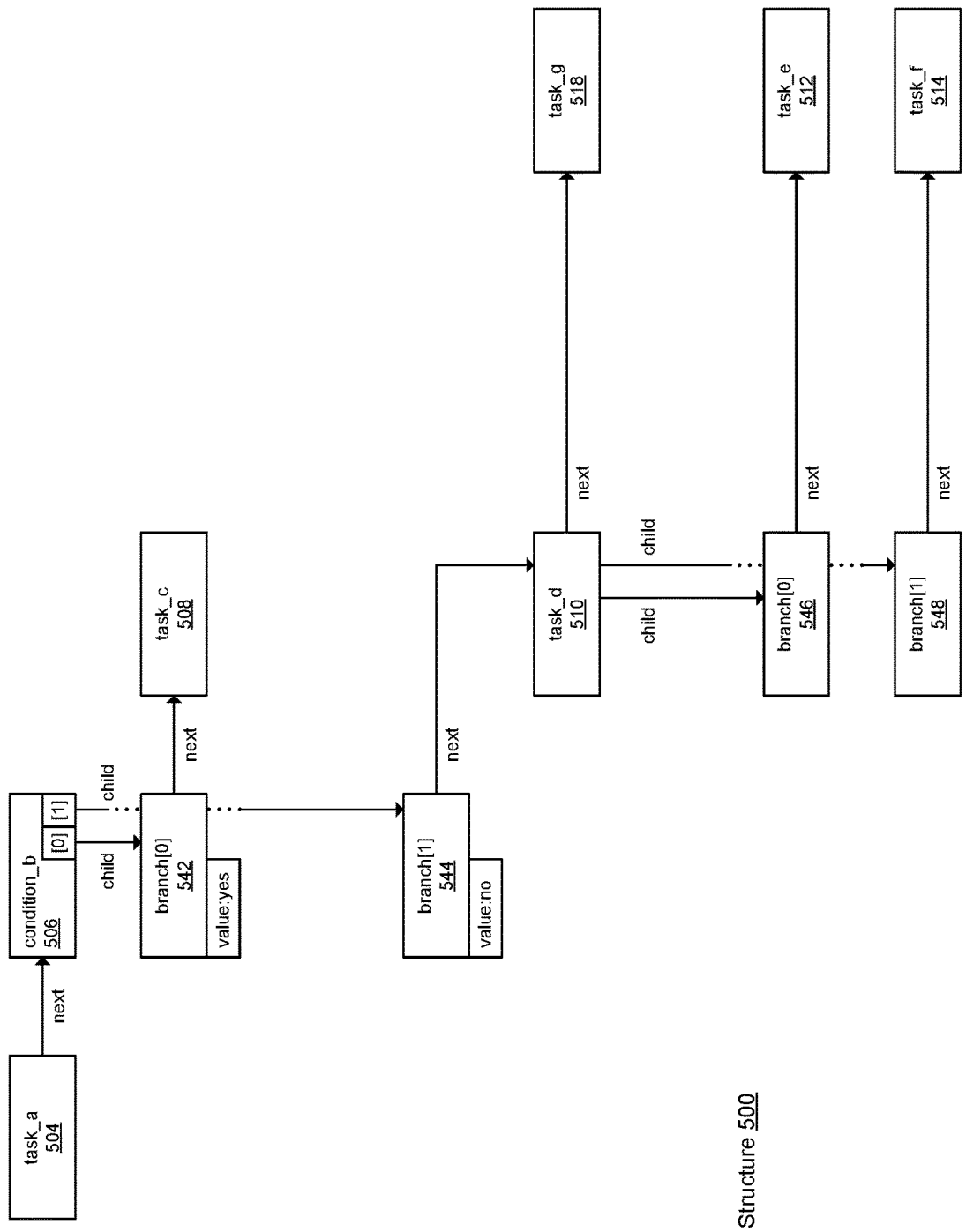
FIG. 5 is a diagram of an example model structure 500.

At 204, the computer system builds a model structure based on the programming data structure. For example, the server computer 104 may build a model structure based on the programming data structure (see 202). The model structure includes a number of nodes, and the nodes of the model structure correspond to the nodes of the programming data structure. An example of the model structure is shown in FIG. 5, and the building process is described in more detail in Section 2 below.

At 206, the computer system receives and collects a number of extension instructions. The extension instructions correspond to changes to the workflow. For example, the server computer 104 may collect a number of extension instructions resulting from the developer changing the workflow via the user interface of the client computer 102.

Collecting the extension instructions includes the computer system ordering the extension instructions according to dependencies among the extension instructions. The ordering process is described in more detail in Section 3 below.

At 208, the computer system applies the extension instructions to the workflow. For example, the server computer 104 may apply the extension instructions (see 206) to the workflow (see 202). Applying the extension instructions includes the computer system generating an extended (e.g., edited, modified, added, deleted, etc.) workflow. The extended workflow is similar to the original workflow (see 202), but differs from the original workflow in that the extended workflow includes the extensions. The applying process is described in more detail in Section 4 below.

Users may then use the extended workflow to perform activities such as provisioning a cloud computing system, provisioning a cloud application, etc., for example by using a computer system to execute the microservices according to the extended workflow.

As mentioned above, the following Sections 1-4 provide further details of the workflow development system 100 and the method 200. Section 1 provides more details on 202, Section 2 provides more details on 204, Section 3 provides more details on 206, and Section 4 provides more details on 208.

Section 1: Loading the Workflow

FIG. 3A is a flow diagram of an example workflow 300. The workflow 300 includes a number of nodes and a number of connections between the nodes. The nodes include task nodes 304, 308, 310, 312, 314 and 318; a condition node 306; a start node 302 and an end node 320, etc. Each of the task nodes 304 represents a workflow instruction, which generally includes criteria and actions as discussed above. The workflow 300 also includes other connection structures such as a gate 316.

The workflow 300 starts with task node 304, which contains the task "task_a", then evaluates the condition "condition_b" represented by condition node 306; if the result is true, the flow executes the task "task_d" in task node 310, else the flow executes the task "task_c" in task node 308 and returns to "condition_b". The task "task_d" triggers the executions of the task "task_e" in task node 312 and the task "task_f" in task node 314 at the same time. After both the task "task_e" and the task "task_f" are finished, as represented by the gate 316, the task "task_g" in task node 318 is executed and the flow stops.

The workflow may be defined via formats such as JavaScript Object Notation (JSON), a domain-specific language (DSL), Extensible Markup Language (XML), or native programming code. An example of the workflow 300 defined via a DSL is shown in FIG. 3B, and an example of the workflow 300 defined via XML is shown in FIG. 3C.

FIG. 3B shows an example of the workflow 300 (see FIG. 3A) defined via a DSL. Note how the nodes of FIG. 3A correspond to variables that are evaluated via the various commands in the DSL in FIG. 3B. For example, the command start("task_a") at 350 operates on "task_a", indicating that the program of FIG. 3B starts with "task_a" as with the task node 304 of FIG. 3A. As another example, the command on("condition_b") at 352 operates on "condition_b", indicating that the program of FIG. 3B implements the decisions and flows of "condition_b" as with the condition node 306 of FIG. 3A.

FIG. 3C shows an example of the workflow 300 (see FIG. 3A) defined via a markup language (e.g., XML). Note how the nodes of FIG. 3A correspond to the data in the tags of the markup language in FIG. 3C. For example, note that the tag sequenceFlow at 360 operates on the data "task_a" as sourceRef and "condition_b" as targetRef, indicating that the markup of FIG. 3C implements the tasks, conditions and flows of "task_a" and "condition_b" as with the task node 304 and the condition node 306 of FIG. 3A.

To perform workflow extension, the developer may perform textual editing of the workflow definition (e.g., as shown in FIG. 3B, FIG. 3C, etc.) directly. However, evaluating the workflow when represented by a visual arrangement such as in FIG. 3A is easier as compared to the textual representations of FIGS. 3B and 3C. Extending the workflow using visual editing tools is discussed in relation to FIG. 4.

FIG. 4 is a diagram of an example programming data structure 400. In general, the workflow development system 100 (see FIG. 1) generates a programming data structure from the workflow definition (e.g., as shown in FIG. 3B, FIG. 3C, etc.) and displays the programming data structure visually (e.g., as shown in FIG. 4). The programming data structure in general is a translation of a workflow defined textually (e.g., via a DSL as in FIG. 3B, via XML as in FIG. 3C, via JSON, via native programming code, etc.) into a data structure that has a corresponding visual format. The workflow development system 100 (see FIG. 1) may then display the programming data structure to the developer to perform the extension process.

The programming data structure 400 includes a number of nodes and a number of connections between the nodes, as with the workflow 300. Consequently, nodes 402, 404, 406, 408, 410, 412, 414 and 418 correspond to similarly-numbered nodes 302, 304, 306, 308, 310, 312, 314 and 318 in FIG. 3A. The programming data structure 400 additionally includes flow nodes and branch nodes. The flow nodes include sequence flow nodes 430, 432, 434, 436 and 438, and a parallel flow node 440. The branch nodes include branch nodes 442, 444, 446 and 448. The programming data structure 400 also includes other information that relate to the flow, such as "first" indicators (e.g. in 430, 432 and 434), "value" indicators (e.g. in 442 and 444), "child" indicators (e.g. from 406 to 442 and 444, from 440 to 446 and 448), "next" indicators (e.g. out from 404, 408, 410, 436, 438, 440, 442, 444, 446 and 448), etc.

The workflow management system 100 (e.g., the server computer 104 of FIG. 1) may execute various computer programs to generate the programming data structure of FIG. 4 from the workflow definition of the workflow. For example, when the workflow is defined via DSL as in FIG. 3B, the server computer 104 may execute a DSL parser to generate the programming data structure 400. As another example, when the workflow is defined via XML as in FIG. 3C, the server computer 104 may use an XML parser to generate the programming data structure 400. The server computer 104 may generate the programming data structure as part of executing 202 at FIG. 2.

The developer may then perform the extension process by manipulating the visual representation of the workflow (e.g., as shown in FIG. 4). Although the programming data structure shown in FIG. 4 is small and not very complex, in many commercial applications, programming data structures including hundreds or thousands of nodes with hundreds or thousands of connections are displayed. The larger and more complex programming data structures are neither easy for the developer to follow nor easy to use to pinpoint exact locations within the programming data structures. Section 2 addresses this issue.

Section 2: Building the Model Structure

FIG. 5 is a diagram of an example model structure 500. In general, the workflow development system 100 (see FIG. 1) generates a model structure from the data file of the programming data structure (e.g., as visually displayed in FIG. 4 as discussed in Section 1) and displays the model structure visually (e.g., as shown in FIG. 5). A model structure in general defines the logical structure of a data file and the way the data file is accessed and manipulated. A model structure may conform to a defined format, such as a Document Object Model (DOM) tree in the DOM format, where the logical structure of the DOM tree corresponds to the data file of the programming data structure (e.g. the programming data structure 400 of FIG. 4), regardless of whether the programming data structure is written via a DSL (e.g., see FIG. 3B), via XML (e.g., see FIG. 3C), via JSON, via native programming code, etc. The workflow development system 100 generates the model structure using the data file of the programming data structure as input, for example as part of executing 204 at FIG. 2.

The model structure 500 includes a number of nodes and a number of connections between the nodes, as with the workflow 300 (see FIG. 3A) and the programming data structure 400 (see FIG. 4). Consequently, nodes 504, 506, 508, 510, 512, 514, 518, 542, 544, 546 and 548 correspond to similarly-numbered nodes 404, 406, 408, 410, 412, 414, 418, 442, 444, 446 and 448 in FIG. 4, with nodes 542, 544, 546 and 548 being branch nodes. Note that as compared to the programming data structure 400, the model structure 500 omits the flow nodes (e.g., 430, 432, 434, 436, 438 and 440). More generally, the model structure 500 is a translation of the programming data structure 400 that corresponds to a simpler data structure (e.g., a simplified DOM tree) that only contains the tasks, conditions and branches, with the other types of structures and details being omitted. The other details of the model structure 500 are otherwise similar to those of the programming data structure 400. As can be discerned, the relative complexity of FIG. 5 is less than that of FIG. 4, and therefore correspondingly, the relative ease in viewing and locating specific nodes and connections is greater in FIG. 5 than in FIG. 4.

The workflow management system 100 (e.g., the server computer 104 of FIG. 1) may execute various computer programs to generate the model structure of FIG. 5 from the data file of the programming data structure of FIG. 4. For example, when the programming data structure is defined via DSL, the server computer 104 may execute a DSL parser to generate the model structure 500. As another example, when the programming data structure is defined via XML, the server computer 104 may execute an XML parser to generate the model structure 500. The server computer 104 may generate the model structure from the data file of the programming data structure as part of executing 204 at FIG. 2.

The workflow management system 100 also generates links that link each node in the model structure (e.g. as shown in FIG. 5) to each corresponding node of the programming data structure (e.g. as shown in FIG. 4). The links are not shown in FIGS. 4-5; the workflow management system 100 uses the links as part of locating nodes as described with reference to FIG. 6. For example, node 504 includes a link to node 404; and similarly 506 includes a link to 406, 508 to 408, 510 to 410, 512 to 412, 514 to 414, 518 to 418, 542 to 442, 544 to 444, 546 to 446, 548 to 448, etc. When the data file defining the programming data structure is a DOM tree, the model structure then corresponds to a simplified DOM tree. The workflow development system 100 may then use XPath to specify a node or nodes in the simplified DOM tree to specify the corresponding task in the DOM tree. More generally, the workflow development system 100 uses a path specification that is appropriate for the particular format of the programming data structure and the model structure, e.g. XPath for XML, JSONPath for JSON, etc. to generate the links.

FIG. 6 is a pseudocode listing 600 of a process to generate the model structure from the programming data structure. For ease of description, the pseudocode listing specifically discusses a DOM tree, with the understanding that the DOM tree may be replaced with another format when the model structure and the programming data structure are defined via that other format. The pseudocode listing 600 operates on the data file that defines the programming data structure. In the pseudocode listing 600, the code at the step 4.*a* (see reference numeral 602) associates the node in the model structure to the corresponding node in the programming data structure to generate the link between the nodes. The pseudocode listing 600 may be implemented using a language such as Java, a DSL, etc. The workflow development system 100 may implement the pseudocode listing 600 as part of building the model structure (see FIG. 2 at 204).

As compared to the programming data structure, the model structure is more easily searchable using XPath, JSONPath, etc. For example, the workflow development system 100 may more easily locate elements, nodes, etc. This is accomplished by decreasing the number of nodes and connections in the model structure as compared to the programming data structure and searching using XPath. Additionally, the workflow development system 100 may more easily trace nodes in the model structure to activities in the programming data structure using the links. For example, when the developer uses the workflow development system 100 to perform the extension process on a given node in the model structure, the link enables the workflow development system 100 to perform the extension process on the corresponding node in the programming data structure.

Section 3: Collecting the Extension Instructions

Once the workflow development system 100 (see FIG. 1) has built the model structure (e.g., the model structure 500 of see FIG. 5; see also Section 2 and 204 in FIG. 2), the workflow development system 100 may process extension instructions received from the user to manipulate the model structure in memory as part of generating an extended workflow (see also 206 in FIG. 2). In general, the extension instructions correspond to modifications of a first workflow to generate a second workflow, referred to as the extended workflow. To extend the workflow, the workflow development system 100 determines the workflow to extend, the action to take, and the location in the workflow of the action to be applied.

3.1 Extension Instructions

An extension instruction includes three parts. Part 1 is the position. The position includes two parts: the name of the workflow and a path. The path specifies where the action should be applied in the workflow. Part 2 is the action, which is the action to take, such as inserting an activity before the position. Part 3 is the object, which is the object used to extend the flow. Normally the object is an activity, but also can be another type of workflow node.

3.1.1 Position

After the workflow development system 100 has transferred the programing data structure into the model structure (see Section 2 and 204 in FIG. 2), the workflow development system 100 may use a Path command (e.g., JSONPath, XPath, etc.) to specify the node or nodes where the instructions will be applied. For example, if the workflow development system 100 wants to specify the activity named "task_e" (see 512 in FIG. 5), the system can use the XPath shown in FIG. 7 to point to the activity.

FIG. 7 is a pseudocode listing 700 shows an example of an XPath for specifying an activity, such as in node 512 of FIG. 5. Note how the elements of the pseudocode listing 700 correspond to the elements of FIG. 5. Numeral 702 indicates that the relationship between "task_e" and "task_d" includes "branch[0]". Numeral 704 indicates that the relationship between "task_e" and "task_a" includes "condition_b", "branch[1]" and "task_d". Numeral 706 indicates that the relationship between "task_e" and "condition_b" includes "branch[1]".

3.1.2 Action

The workflow development system 100 may operate on the following actions when collecting the extension instructions: insert, delete, append and replace. "Insert" adds a new node to the workflow, for example a new task node or a new condition node before an existing node. "Delete" removes an existing node. "Append" adds a new node after an existing node. "Replace" replaces an existing node with a new node or a modification of the existing node.

3.1.3 Object

The object is a fragment of the workflow that can be added to the workflow. For the "insert", "append" and "replace" actions, the object must be specified. For the "delete" action, an object is not needed. An object may be an activity, a branch or another type of object that can be handled by the workflow.

An extension instruction may be defined in different forms, including a DSL, a native programming language, etc. An example is provided in FIG. 8.

FIG. 8 is a pseudocode listing 800 of an extension instruction. The pseudocode listing 800 is written in Java. In the pseudocode listing 800, the extension instruction is defined via annotation "FlowContribution" to an Activity bean. For example, the code portion 802 indicates that the position is "(flow="flowA", path="//task_e")", the action is "insert", and the object is the Activity created in a method named "taskBeforeTaskE( )". The developer may write the extension instructions textually, or may manipulate the model structure (e.g. as shown in FIG. 5) graphically, as part of extending (e.g., inserting, appending, replacing, deleting, etc.) the workflow.

3.2 Collecting the Extension Instructions

After the workflow has been loaded (see 202 in FIG. 2 and Section 1), the workflow development system 100 collects the extension instructions related to the workflow. FIG. 9 details the collection process.

FIG. 9 is a pseudocode listing 900 that describes a process for collecting the extension instructions. Reference numeral 902 refers to grouping the flow contributions (step 2), as reflected in TABLE 1.

TABLE 1

| Flow Group | Position Group | Flow Contribution | Description |
|---|---|---|---|
| flowA | //task_e | taskBeforeTaskE taskBeforeTaskE2 | //task_e can be found in flowA |
| | n/a | task AppendToTail | No path given for this group, so they are either add to the head or append to the tail |
| | //task_x | TaskAfterTaskX1 | The //task_x cannot be found in the flowA yet, but might be found in the node contributed by contributions |

After the workflow development system 100 has ordered the groups (see step 3 at 904), the results are shown in TABLE 2.

TABLE 2

| Flow Group | Position Group | Flow Contribution | Description |
|---|---|---|---|
| flowA | n/a | task AppendToTail | No path given for this group, so they are either add to the head or append to the tail |
| | //task_e | taskBeforeTaskE task BeforeTaskE2 | //task_e can be found in flowA |
| | //task_x | TaskAfterTaskX1 | The //task_x cannot be found in the flowA yet, but might be found in the node contributed by contributions |

Among the position groups, there are three types: a Pinned position group, an Un-pinned position group, and a ToBeDecided position group. The Pinned position group includes elements where the path of the group can be found in the current model structure of the workflow. The Un-pinned position group includes elements where no path is given in the position group. The ToBeDecided position group includes elements where the path is given, but it cannot be found in the current model structure of the workflow now; however it might be found after the workflow has been extended by other position groups.

Section 4: Applying the Extension Instructions

Once the workflow development system 100 (see FIG. 1) has collected and grouped the extension instructions (see Section 3 and 206 in FIG. 2), the workflow development system 100 applies the extension instructions to the target workflow to extend the workflow (see also 208 in FIG. 2). Steps for performing the extension process for one workflow are shown in FIG. 10.

FIG. 10 is a pseudocode listing 1000 that describes a process for applying the extension instructions to the target workflow. In the pseudocode listing 1000, the reference numeral 1002 (step 2.c) refers to continuing the process according to FIG. 11. As can be seen, the pseudocode listing 1000 operates on the Un-pinned position group and the ToBeDecided position group. The pseudocode listing 1000 determines flow contributions of the position groups (e.g., step 2 and step 3), rebuilds the model structure (e.g., the DOM, in step 5), and performs error checking (e.g., step 7.c) to catch user errors (e.g., the user has specified a node that does not exist).

FIG. 11 is a pseudocode listing 1100 that describes a process for applying the flow contributions of the extension instructions to the workflow. The pseudocode 1100 operates using the action (e.g., step 1), the path (e.g., step 2), and the object (e.g., step 3) to determine the reference node. The pseudocode 1100 then applies the actions (e.g., step 4) with reference to the reference node.

Advantages

As discussed above, the workflow development systems described herein may provide a number of advantages as compared to existing systems. One advantage is that the workflow development system 100 (see FIG. 1) provides time savings to the user when modifying, updating, creating or extending a workflow, especially when the workflow is used in a microservice architecture.

Figure 12:
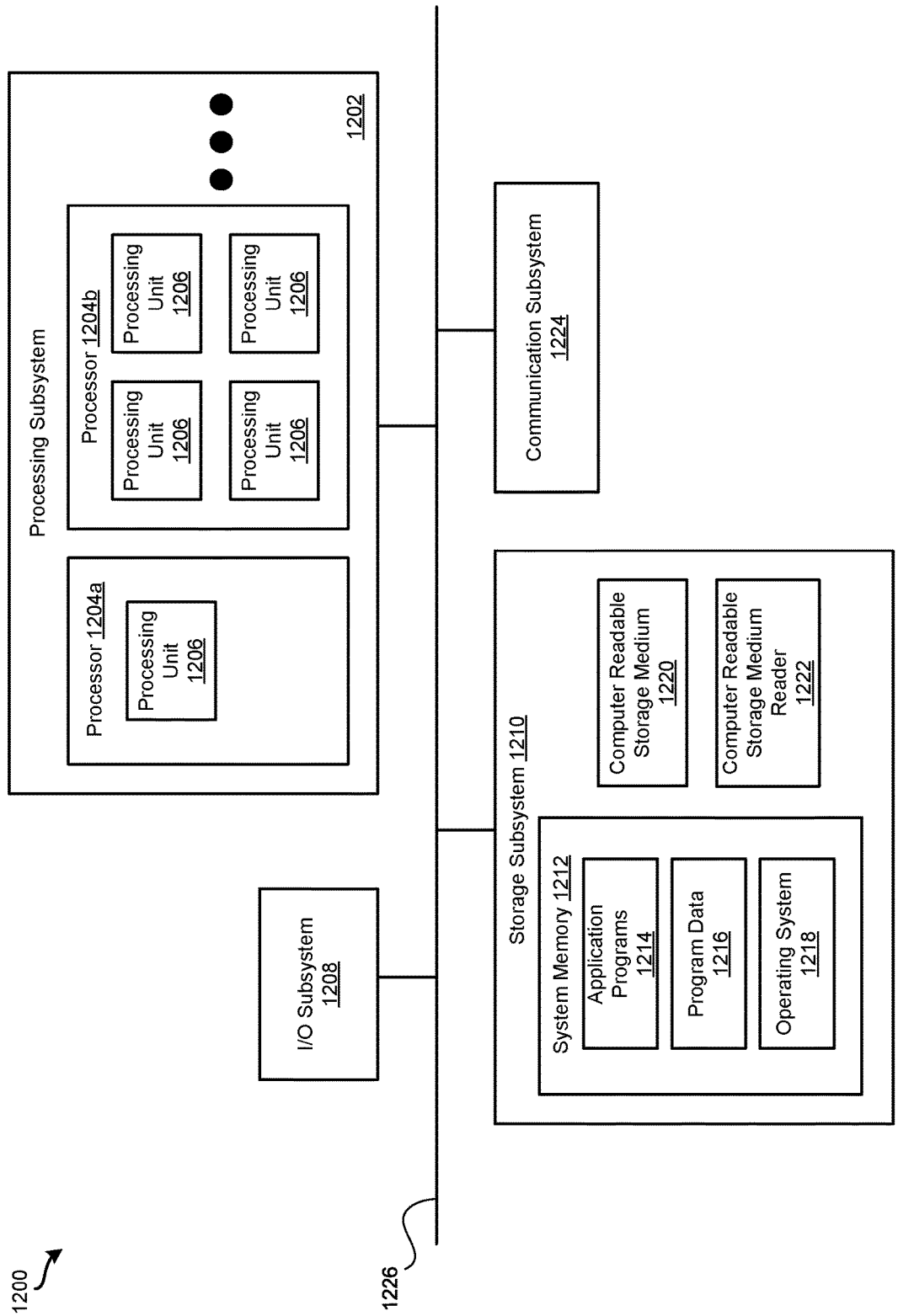
FIG. 12 is a block diagram of an example computer system 1200 for implementing various embodiments described herein.

FIG. 12 is a block diagram of an example computer system 1200 for implementing various embodiments described above. For example, the computer system 1200 may be used to implement the workflow development system 100 (see FIG. 1), etc. The computer system 500 may be a desktop computer, a laptop, a server computer, or any other type of computer system or combination thereof. Some or all elements of the client computer 102, the server computer 104, the database computer 106, etc. or combinations thereof can be included or implemented in the computer system 1200. In addition, the computer system 1200 can implement many of the operations, methods, or processes described above (e.g., the method 200 of FIG. 2, the pseudocode listings of FIGS. 6-11, etc.). As shown in FIG. 12, the computer system 1200 includes a processing subsystem 1202, which communicates, via a bus subsystem 1226, with an input/output (I/O) subsystem 1208, a storage subsystem 1210 and a communication subsystem 1224.

The bus subsystem 1226 is configured to facilitate communication among the various components and subsystems of the computer system 1200. While the bus subsystem 1226 is illustrated in FIG. 12 as a single bus, one of ordinary skill in the art will understand that the bus subsystem 1226 may be implemented as multiple buses. The bus subsystem 1226 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

The processing subsystem 1202, which can be implemented as one or more integrated circuits (e.g., a conventional microprocessor or microcontroller), controls the operation of the computer system 1200. The processing subsystem 1202 may include one or more processors 1204. Each processor 1204 may include one processing unit 1206 (e.g., a single core processor such as the processor 1204a) or several processing units 1206 (e.g., a multicore processor such as the processor 1204b). In some embodiments, the processors 1204 of the processing subsystem 1202 may be implemented as independent processors while, in other embodiments, the processors 1204 of the processing subsystem 1202 may be implemented as multiple processors integrate into a single chip or multiple chips. Still, in some embodiments, the processors 1204 of the processing subsystem 1202 may be implemented as a combination of independent processors and multiple processors integrated into a single chip or multiple chips.

In some embodiments, the processing subsystem 1202 may execute a variety of programs or processes in response to program code and can maintain multiple concurrently executing programs or processes. At any given time, some or all of the program code to be executed may reside in the processing subsystem 1202 or in the storage subsystem 1210. Through suitable programming, the processing subsystem 1202 may provide various functionalities, such as the functionalities described above by reference to the method 200 (see FIG. 2), the pseudocode listings of FIGS. 6-11, etc.

The I/O subsystem 1208 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, or other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, or other types of devices and mechanisms for outputting information from the computer system 1200 to a user or another device (e.g., a printer).

As illustrated in FIG. 12, the storage subsystem 1210 includes a system memory 1212, a computer-readable storage medium 1220, and a computer-readable storage medium reader 1222. The storage subsystem 1210 may implement the storage for the workflows 110, the microservices 112, etc. The system memory 1212 may be configured to store software in the form of program instructions that are loadable and executable by the processing subsystem 1202 as well as data generated during the execution of program instructions. In some embodiments, the system memory 1212 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). The system memory 1212 may include different types of memory, such as static random access memory (SRAM) and/or dynamic random access memory (DRAM). The system memory 1212 may include a basic input/output system (BIOS), in some embodiments, that is configured to store basic routines to facilitate transferring information between elements within the computer system 1200 (e.g., during start-up). Such a BIOS may be stored in ROM (e.g., a ROM chip), flash memory, or another type of memory that may be configured to store the BIOS.

As shown in FIG. 12, the system memory 1212 includes application programs 1214 (e.g., that implement the workflow development system 100), program data 1216, and operating system (OS) 1218. The OS 1218 may be one of various versions of Microsoft Windows™, Apple Mac OS™, Apple OS X™, Apple macOS™, and/or Linux™ operating systems, a variety of commercially-available UNIX™ or UNIX-like operating systems (including without limitation the variety of GNU/Linux operating systems, the Google Chrome™ OS, and the like) and/or mobile operating systems such as Apple iOS™, Windows Phone™, Windows Mobile™, Android™, BlackBerry OS™, Blackberry 10™, Palm OS™ and WebOS™ operating systems.

The computer-readable storage medium 1220 may be a non-transitory computer-readable medium configured to store software (e.g., programs, code modules, data constructs, instructions, etc.). Many of the components (e.g., the workflow development system 100, etc.) or processes (e.g., the method 200, the pseudocode listings of FIGS. 6-11, etc.) described above may be implemented as software that when executed by a processor or processing unit (e.g., a processor or processing unit of the processing subsystem 1202) performs the operations of such components and/or processes. The storage subsystem 1210 may also store data used for, or generated during, the execution of the software.

The storage subsystem 1210 may also include the computer-readable storage medium reader 1222 that is configured to communicate with the computer-readable storage medium 1220. Together and, optionally, in combination with the system memory 1212, the computer-readable storage medium 1220 may comprehensively represent remote, local, fixed, and/or removable storage devices plus storage media for temporarily and/or more permanently containing, storing, transmitting, and retrieving computer-readable information.

The computer-readable storage medium 1220 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or other types of computer-readable storage media or device.

The communication subsystem 1224 serves as an interface for receiving data from, and transmitting data to, other devices, computer systems, and networks. For example, the communication subsystem 1224 may allow the computer system 1200 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). The communication subsystem 1224 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth™, ZigBee™, etc., or any combination thereof), global positioning system (GPS) receiver components, or other components. In some embodiments, the communication subsystem 1224 may provide components configured for wired communication (e.g., Ethernet) in addition to or instead of components configured for wireless communication.

One of ordinary skill in the art will realize that the architecture shown in FIG. 12 is only an example architecture of the computer system 1200, and that the computer system 1200 may have additional or fewer components than shown, or a different configuration of components. The various components shown in FIG. 12 may be implemented in hardware, software, firmware or any combination thereof, including one or more signal processing and/or application specific integrated circuits.

Figure 13:
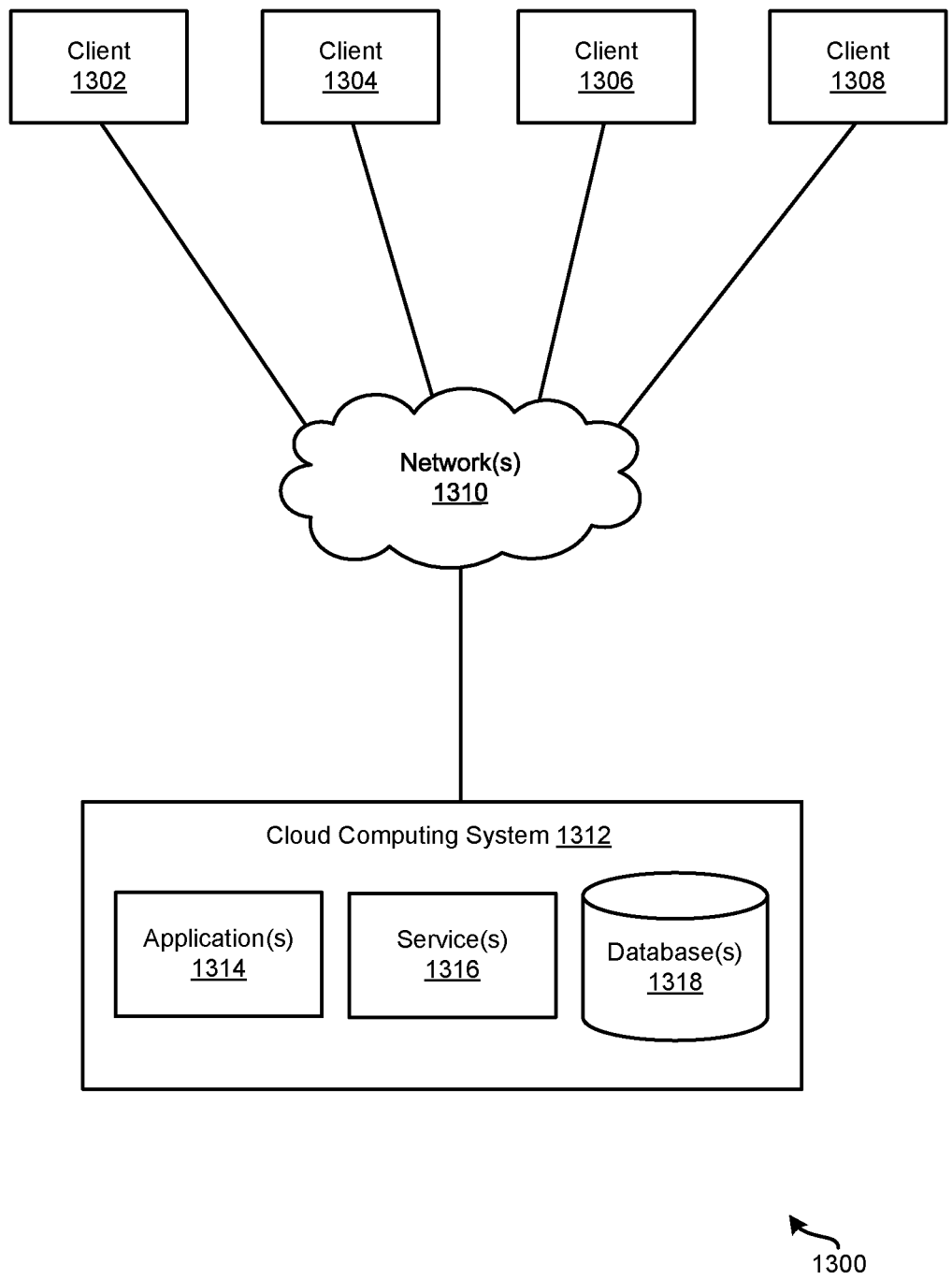
FIG. 13 is a block diagram of a cloud computing system 1300 for implementing various embodiments described herein.

FIG. 13 is a block diagram of a cloud computing system 1300 for implementing various embodiments described above. For example, one of the client devices 1302-1308 may be used to implement a client device for accessing the workflow development system 100 by a developer (see 102 in FIG. 1), a cloud computing system 1312 of the system 1300 may be used to implement the server computer 104, the database computer 106, etc. As shown, the system 1300 includes the client devices 1302-1308, one or more networks 1310, and the cloud computing system 1312. The cloud computing system 1312 is configured to provide resources and data to the client devices 1302-1308 via the networks 1310. In some embodiments, the cloud computing system 1300 provides resources to any number of different users (e.g., customers, tenants, organizations, etc.). The cloud computing system 1312 may be implemented by one or more computer systems (e.g., servers), virtual machines operating on a computer system, or a combination thereof.

As shown, the cloud computing system 1312 includes one or more applications 1314, one or more services 1316, and one or more databases 1318. The cloud computing system 1300 may provide the applications 1314, services 1316, and databases 1318 to any number of different customers in a self-service, subscription-based, elastically scalable, reliable, highly available, and secure manner.

In some embodiments, the cloud computing system 1300 may be adapted to automatically provision, manage, and track a customer's subscriptions to services offered by the cloud computing system 1300. The cloud computing system 1300 may provide cloud services via different deployment models. For example, cloud services may be provided under a public cloud model in which the cloud computing system 1300 is owned by an organization selling cloud services and the cloud services are made available to the general public or different industry enterprises. As another example, cloud services may be provided under a private cloud model in which the cloud computing system 1300 is operated solely for a single organization and may provide cloud services for one or more entities within the organization. The cloud services may also be provided under a community cloud model in which the cloud computing system 1300 and the cloud services provided by the cloud computing system 1300 are shared by several organizations in a related community. The cloud services may also be provided under a hybrid cloud model, which is a combination of two or more of the aforementioned different models.

In some instances, any one of the applications 1314, services 1316, and databases 1318 made available to the client devices 1302-1308 via the networks 1310 from the cloud computing system 1300 is referred to as a "cloud service". Typically, servers and systems that make up the cloud computing system 1300 are different from the on-premises servers and systems of a customer. For example, the cloud computing system 1300 may host an application and a user of one of client devices 1302-1308 may order and use the application via the networks 1310.

The applications 1314 may include software applications that are configured to execute on the cloud computing system 1312 (e.g., a computer system or a virtual machine operating on a computer system) and be accessed, controlled, managed, etc. via the client devices 1302-1308. In some embodiments, the applications 1314 may include server applications and/or mid-tier applications (e.g., HTTP (hypertext transport protocol) server applications, FTP (file transfer protocol) server applications, CGI (common gateway interface) server applications, Java™ server applications, etc.). The services 1316 are software components, modules, application, etc. that are configured to execute on the cloud computing system 1312 and provide functionalities to the client devices 1302-1308 via the networks 1310. The services 1316 may be web-based services or on-demand cloud services.

The databases 1318 are configured to store and/or manage data that is accessed by the applications 1314, the services 1316, or the client devices 1302-1308. For instance, the workflows 110, the microservices 112, etc. may be stored in the databases 1318. The databases 1318 may reside on a non-transitory storage medium local to (and/or resident in) the cloud computing system 1312, in a storage-area network (SAN), or on a non-transitory storage medium local located remotely from the cloud computing system 1312. In some embodiments, the databases 1318 may relational databases that are managed by a relational database management system (RDBMS), etc. The databases 1318 may be a column-oriented databases, row-oriented databases, or a combination thereof. In some embodiments, some or all of the databases 1318 are in-memory databases. That is, in some such embodiments, data for the databases 1318 are stored and managed in memory (e.g., random access memory (RAM)).

The client devices 1302-1308 are configured to execute and operate a client application (e.g., a web browser, a proprietary client application, etc.) that communicates with the applications 1314, services 1316, or databases 1318 via the networks 1310. This way, the client devices 1302-1308 may access the various functionalities provided by the applications 1314, services 1316, and databases 1318 while the applications 1314, services 1316, and databases 1318 are operating (e.g., hosted) on the cloud computing system 1300. The client devices 1302-1308 may be the computer system 1200 (see FIG. 12). Although the system 1300 is shown with four client devices, any number of client devices may be supported.

The networks 1310 may be any type of network configured to facilitate data communications among the client devices 1302-1308 and the cloud computing system 1312 using any of a variety of network protocols. The networks 1310 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented method of extending workflows, the method comprising:
    loading, by a computer system, a workflow into a memory of the computer system, wherein the workflow includes a plurality of workflow rules, and wherein a given workflow rule of the plurality of workflow rules includes one or more criteria and one or more actions, wherein loading the workflow includes:
        translating, by the computer system, the workflow into a programming data structure, wherein the programming data structure includes a plurality of nodes, wherein the plurality of nodes of the programming data structure corresponds to the plurality of workflow rules;
    building, by the computer system, a model structure based on the programming data structure, wherein the model structure includes a plurality of nodes, wherein the plurality of nodes of the model structure corresponds to the plurality of nodes of the programming data structure;
    receiving, by the computer system, a plurality of extension instructions, wherein the plurality of extension instructions corresponds to changes to the workflow;
    collecting, by the computer system, the plurality of extension instructions, wherein collecting the plurality of extension instructions includes:
        ordering, by the computer system, the plurality of extension instructions according to dependencies among the plurality of extension instructions; and
    applying, by the computer system, the plurality of extension instructions to the workflow, wherein applying the plurality of extension instructions includes:
        generating, by the computer system, an extended workflow,
    wherein collecting the plurality of extension instructions includes:
        reading, by the computer system, a plurality of flow contributions, wherein the plurality of flow contributions corresponds to the plurality of extension instructions;
        grouping, by the computer system, the plurality of flow contributions, wherein a given flow contribution of the plurality of flow contributions includes a flow group and a position group; and
        ordering, by the computer system, the plurality of flow contributions first according to each of a plurality of flow groups, and second according to each of a plurality of position groups of a given flow group, and
    wherein the plurality of position groups includes one or more of a pinned position group, an un-pinned position group, and a to-be-decided position group, wherein the pinned position group corresponds to a group with a path that is found in the model structure, wherein the un-pinned position group corresponds to a group with a path that is undefined, and wherein the to-be-decided position group corresponds to a group with a path that is not found in the model structure.

2. The method of claim 1, wherein the programming data structure is a translation of a workflow defined textually into a data structure that has a corresponding visual format.

3. The method of claim 1, wherein the model structure defines a logical structure of a data file and a way the data file is accessed and manipulated.

4. The method of claim 1, wherein the model structure is a Document Object Model (DOM) tree.

5. The method of claim 1, wherein a given extension instruction of the plurality of extension instructions includes a position, an action and an object.

6. The method of claim 1, wherein ordering a given position group of the plurality of position groups includes:
    first, selecting a first subset of the plurality of position groups, wherein each of the first subset has a path that is undefined;
    second, selecting a second subset of the plurality of position groups, wherein each of the second subset has a path that is present in the given flow group; and third, selecting a third subset of the plurality of position groups, wherein each of the third subset is neither in the first subset nor in the second subset.

7. The method of claim 1, further comprising, when the un-pinned position group is not empty:
translating, by the computer system, the extended workflow into an extended programming data structure; and
building, by the computer system, an extended model structure based on the extended programming data structure.

8. A non-transitory computer readable medium storing instructions that, when executed by a processor of a computer system, control the computer system to perform a method of extending workflows, the method comprising:
loading, by the computer system, a workflow into a memory of the computer system, wherein the workflow includes a plurality of workflow rules, and wherein a given workflow rule of the plurality of workflow rules includes one or more criteria and one or more actions, wherein loading the workflow includes:
translating, by the computer system, the workflow into a programming data structure, wherein the programming data structure includes a plurality of nodes, wherein the plurality of nodes of the programming data structure corresponds to the plurality of workflow rules;
building, by the computer system, a model structure based on the programming data structure, wherein the model structure includes a plurality of nodes, wherein the plurality of nodes of the model structure corresponds to the plurality of nodes of the programming data structure;
receiving, by the computer system, a plurality of extension instructions, wherein the plurality of extension instructions corresponds to changes to the workflow;
collecting, by the computer system, the plurality of extension instructions, wherein collecting the plurality of extension instructions includes:
ordering, by the computer system, the plurality of extension instructions according to dependencies among the plurality of extension instructions; and
applying, by the computer system, the plurality of extension instructions to the workflow, wherein applying the plurality of extension instructions includes:
generating, by the computer system, an extended workflow,
wherein collecting the plurality of extension instructions includes:
reading, by the computer system, a plurality of flow contributions, wherein the plurality of flow contributions corresponds to the plurality of extension instructions;
grouping, by the computer system, the plurality of flow contributions, wherein a given flow contribution of the plurality of flow contributions includes a flow group and a position group; and
ordering, by the computer system, the plurality of flow contributions first according to each of a plurality of flow groups, and second according to each of a plurality of position groups of a given flow group, and
wherein the plurality of position groups includes one or more of a pinned position group, an un-pinned position group, and a to-be-decided position group, wherein the pinned position group corresponds to a group with a path that is found in the model structure, wherein the un-pinned position group corresponds to a group with a path that is undefined, and wherein the to-be-decided position group corresponds to a group with a path that is not found in the model structure.

9. The non-transitory computer readable medium of claim 8, wherein the programming data structure is a translation of a workflow defined textually into a data structure that has a corresponding visual format.

10. The non-transitory computer readable medium of claim 8, wherein the model structure defines a logical structure of a data file and a way the data file is accessed and manipulated.

11. The non-transitory computer readable medium of claim 8, wherein a given extension instruction of the plurality of extension instructions includes a position, an action and an object.

12. The non-transitory computer readable medium of claim 8, wherein ordering a given position group of the plurality of position groups includes:
first, selecting a first subset of the plurality of position groups, wherein each of the first subset has a path that is undefined;
second, selecting a second subset of the plurality of position groups, wherein each of the second subset has a path that is present in the given flow group; and
third, selecting a third subset of the plurality of position groups, wherein each of the third subset is neither in the first subset nor in the second subset.

13. The non-transitory computer readable medium of claim 8, wherein the method further comprises, when the un-pinned position group is not empty:
translating, by the computer system, the extended workflow into an extended programming data structure; and
building, by the computer system, an extended model structure based on the extended programming data structure.

14. A computer system for extending workflows, the computer system comprising:
a memory; and
a processor,
wherein the processor is configured to control the computer system to load a workflow into the memory, wherein the workflow includes a plurality of workflow rules, and wherein a given workflow rule of the plurality of workflow rules includes one or more criteria and one or more actions, wherein loading the workflow includes:
translating, by the computer system, the workflow into a programming data structure, wherein the programming data structure includes a plurality of nodes, wherein the plurality of nodes of the programming data structure corresponds to the plurality of workflow rules;
building, by the computer system, a model structure based on the programming data structure, wherein the model structure includes a plurality of nodes, wherein the plurality of nodes of the model structure corresponds to the plurality of nodes of the programming data structure;
receiving, by the computer system, a plurality of extension instructions, wherein the plurality of extension instructions corresponds to changes to the workflow;
collecting, by the computer system, the plurality of extension instructions, wherein collecting the plurality of extension instructions includes:
ordering, by the computer system, the plurality of extension instructions according to dependencies among the plurality of extension instructions; and applying, by the computer system, the plurality of extension instructions to the workflow, wherein applying the plurality of extension instructions includes:

generating, by the computer system, an extended workflow, wherein collecting the plurality of extension instructions includes:

reading, by the computer system, a plurality of flow contributions, wherein the plurality of flow contributions corresponds to the plurality of extension instructions;

grouping, by the computer system, the plurality of flow contributions, wherein a given flow contribution of the plurality of flow contributions includes a flow group and a position group; and ordering, by the computer system, the plurality of flow contributions first according to each of a plurality of flow groups, and second according to each of a plurality of position groups of a given flow group, and wherein the plurality of position groups includes one or more of a pinned position group, an un-pinned position group, and a to-be-decided position group, wherein the pinned position group corresponds to a group with a path that is found in the model structure, wherein the un-pinned position group corresponds to a group with a path that is undefined, and wherein the to-be-decided position group corresponds to a group with a path that is not found in the model structure.

15. The computer system of claim 14, wherein the programming data structure is a translation of a workflow defined textually into a data structure that has a corresponding visual format.

16. The computer system of claim 14, wherein the model structure defines a logical structure of a data file and a way the data file is accessed and manipulated.

17. The computer system of claim 14, wherein the model structure is a Document Object Model (DOM) tree.

18. The computer system of claim 14, wherein a given extension instruction of the plurality of extension instructions includes a position, an action and an object.

19. The computer system of claim 14, wherein ordering a given position group of the plurality of position groups includes:

first, selecting a first subset of the plurality of position groups, wherein each of the first subset has a path that is undefined;

second, selecting a second subset of the plurality of position groups, wherein each of the second subset has a path that is present in the given flow group; and third, selecting a third subset of the plurality of position groups, wherein each of the third subset is neither in the first subset nor in the second subset.

20. The computer system of claim 14, further comprising, when the un-pinned position group is not empty:

translating, by the computer system, the extended workflow into an extended programming data structure; and building, by the computer system, an extended model structure based on the extended programming data structure.

* * * * *